United States Patent

[11] 3,557,839

| [72] | Inventors | Yoshimitsu Uto;<br>Taizo Yamazaki, Hiroshima-shi; Toshikazu Shinkawa, Asa-Gun, Horishima-ken, Japan |
|---|---|---|
| [21] | Appl. No. | 619,713 |
| [22] | Filed | Mar. 1, 1967 |
| [45] | Patented | Jan. 26, 1971 |
| [73] | Assignee | Mitsubishi Jukogyo Kabushiki Kaisha<br>Tokyo, Japan |

[54] PRESSURE VESSEL WITH LAMINATED WALL STRUCTURE RESISTANT TO HYDROGEN ATTACK
1 Claim, 5 Drawing Figs.

[52] U.S. Cl. ..................................................... 138/143,
    220/3
[51] Int. Cl. .................................................... F16l 9/14
[50] Field of Search ........................................... 138/140,
    141, 142, 143, 144, 170, 171; 220/3

[56] References Cited
UNITED STATES PATENTS
3,224,619  12/1965  Maurin et al. ................  220/3
3,231,338  1/1966  Andrus .........................  220/X Primary Examiner—Herbert F. Ross
Attorney—Mc Glew and Toren ABSTRACT: A pressure vessel which is adapted to be exposed to a hydrogen atmosphere on either its interior or exterior side includes a plurality of longitudinally elongated cylindrical units which are arranged end-to-end and joined together by a continuous annular weld which extends from the interior to the exterior of the vessel. At least one of the units comprises a laminate of a plurality of tubular vessel plates which are arranged one within the other and which are joined together by the weld which joins the units together. The plate on the side of the vessel which is exposed to hydrogen is covered by a protective plate which extends over the weld. The weld seam joining the protector plate to the side of the vessel which is exposed to hydrogen and the protective plate are of a material which is resistant to hydrogen attack. A pressure equalizing hole extends through all of the vessel plates of the laminate and is covered by the protective plate on the side which is exposed to hydrogen.

PRIOR ART

PATENTED JAN 26 1971          3,557,839

INVENTORS
Yoshimitsu UTO
Taizo YAMAZAKI
BY Toshikazu SHINKAWA
McGlew and Toren
ATTORNEYS

PRESSURE VESSEL WITH LAMINATED WALL STRUCTURE RESISTANT TO HYDROGEN ATTACK

BRIEF SUMMARY OF THE INVENTION

This invention relates in general to the construction of pressure vessels or conduits and in particular to a new and useful laminate pressure vessel resistant to hydrogen embrittlement which can be protected against fine cracking, decarburization, embrittlement and other hydrogen defaults at elevated pressures and temperatures.

Hydrogen embrittlement of pressure containers due to the handling of high-pressure, high-temperature hydrogen gas can be avoided when all of the steel materials used in fabricating the vessels are replaced by hydrogen-resistant allows which resist attacks by hydrogen gas at elevated temperatures and pressures. However, such alloys are very expensive and require great technical skill in their heat treatment, welding and other working and this all adds to the manufacturing cost for such containers. The cost of such containers can be cut down considerably by using hydrogen-resistant alloys merely in the fabrication of the inner cylinders and using a less expensive steel such as carbon steel as a lamina plate to constitute the laminate wound around the inner cylinder. It has been found, however, that this is impractical because even though the inner cylinder be formed of a hydrogen-resistant steel, the hydrogen absorbed during operation from the surface of the cylinder or weld metal exposed to the hydrogen gas and the gas penetrates into the steel plates which constitute the laminate. When hydrogen gas is disposed at an elevated pressure and temperature inside a container or around the container, the wall which is exposed to the hydrogen will absorb the hydrogen which becomes diffused in the form of atomic hydrogen into the steel. This hydrogen permeates the inner cylinder wall and flows along the space between the first laminate layer until it is finally led out through one or more of the radially drilled pressure equalizing holes which extend to the opposite side of the vessel. Because of the pressure equalizing hole the pressure inside this space will not exceed the atmospheric pressure and therefore the steel plates constituting the laminate will be protected against hydrogen defaults at locations away from the welded joint. In the area of the welded joint, however, the hydrogen will partially penetrate the deposited metal unless it is made of a hydrogen-resistant material. The hydrogen which does penetrate will diffuse into the steel plates constituting the laminate.

In accordance with the present invention, the weld on the side of the vessel which is exposed to hydrogen is covered by a plate which is resistant to hydrogen attack. In one form the plate is made large enough to cover a weld which joins unit cylinders together.

In accordance with a further feature of the invention, the vessel is made up of a plurality of laminate blocks or units of predetermined length each of which includes a plurality of cylinders arranged one within the other in the form of a laminate structure and where at least one of the blocks is welded to a forged flange member by means of an annular or circumferentially extending weld. In this embodiment, a plate made of a hydrogen-resistant material is employed to cover the weld and it is welded to the adjacent laminate structure and the forged flange by means of a weld material which is resistant to hydrogen attack. The wall of the laminate structure adjacent the hydrogen atmosphere and the forged flange are advantageously made of a steel which is resistant to hydrogen attack.

In a further feature of the invention the laminate structure includes an inner cylinder which has a recess surrounding the area of the circumferential welds to accommodate a plate of a hydrogen-resistant material which is positioned in the recess and bonded to the inner cylinder by a weld which is also made of a hydrogen-resistant material.

Accordingly, it is an object of the invention to provide a container which is made up of a laminate structure comprising a plurality of cylinder plate members arranged one within the other and which are arranged end to end with a similar laminate structure and bonded thereto by an annular weld disposed between the adjacent structures and including a plate covering the weld on the side of the vessel which is to be exposed to a hydrogen atmosphere, the plate being welded by a hydrogen-resistant material to the inner cylinder of the laminate and the cylinder and the plate being also made of a hydrogen-resistant material.

A further object of the invention is to provide a pressure vessel which includes a laminate structure formed of a plurality of tubular plates arranged one within the other joined to a solid forged flange of a hydrogen-resistant material by an annular weld which is disposed therebetween, and a hydrogen-resistant material plate covering said weld and being bonded to said forged flange and to said inner cylinder of the laminate structure, the cylinder plate of said laminate structure on the side adjacent the hydrogen atmosphere being of hydrogen-resistant material.

The various features of novelty which characterize the invention are pointed out with particularity in the claims annexed to and forming a part of this specification.

For a better understanding of the invention, its operating advantages and specific objects attained by its use, reference should be had to the accompanying drawings and descriptive matter in which there are illustrated and described preferred embodiments of the invention.

DETAILED DESCRIPTION

Figure 1:
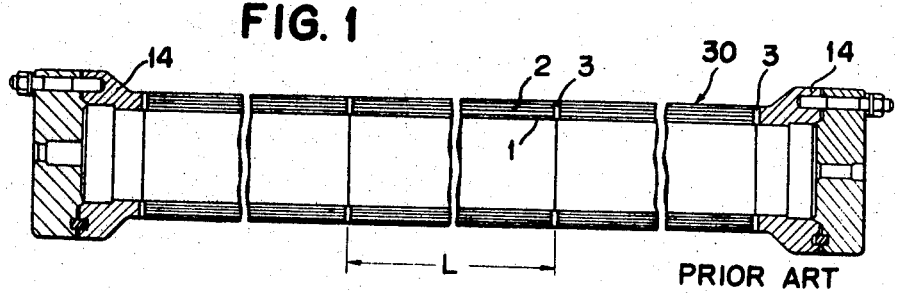
FIG. 1 is a sectional view of a laminated high-pressure container of a type to which the present invention relates as constructed by the prior art.
Figure 2:
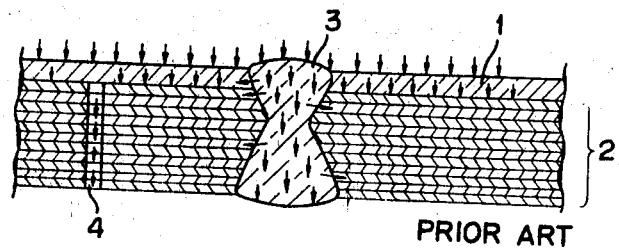
FIG. 2 is an enlarged sectional view of the container indicated in FIG. 1.

A vessel of the tube to which the present invention is applicable is indicated in FIGS. 1 and 2. Such a high-pressure container generally designated 30 is made up of a plurality of cylinder blocks of limited length L which are arranged in side by side relationship and welded together by circumferential welded joints 3. Each block or unit includes a laminated wall structure which may, for example, comprise an inner cylinder 1 and a plurality of laminated cylinder plates or lamina wound around the inner cylinder or built up over the cylinder to a desired thickness. At each end of the container 30 there is provided a flange 14 of forged metal which is bonded to the outermost block by means of a circumferential weld 3.

With the construction described in FIGS. 1 and 2, even though the inner cylinder 1 which is adapted to be exposed to the hydrogen atmosphere, is made of a hydrogen-resistant steel, hydrogen is absorbed during operation from the surface of the deposited metal which is exposed to the inside of the container and it penetrates into the steel plates which constitute the laminate. Thus, unless the laminate is also made of a hydrogen-resistant material, there is a likelihood that hydrogen embrittlement will result. Where there is a hydrogen gas at an elevated pressure and elevated temperature inside the container, part of the hydrogen will be absorbed from the surface of the steel constituting the container and will be diffused in the form of atomic hydrogen into the steel. The hydrogen absorbed from the surface of the inner cylinder 1 penetrates the inner cylinder wall in the direction indicated by the arrows in FIG. 2 and it is then precipitated in the space between the inner cylinder and the remainder of the laminate 2. The gas is finally let out of the container through a detection hole or pressure equalizing hole 4. Since the space on the interior of the vessel becomes communicated through the inner cylinder and through the hole 4, the pressure inside the space does not exceed the atmospheric pressure and therefore the steel plates constituting the laminate can be protected against hydrogen embrittlements at least in the positions away from the welded joints 3. On the other hand, the portion of hydrogen absorbed from the surface of the deposited metal 3 will partially penetrate the metal and flow into the atmosphere while the rest of the hydrogen will diffuse into the individual steel plates which constitute the laminate 2. This means that it will be necessary to use hydrogen-resistant steel for all of the laminate plates in order to insure that there will be no hydrogen-induced faults. Thus, with the prior art a considerable amount of expense is required for the laminate plate structure.

Figure 3:
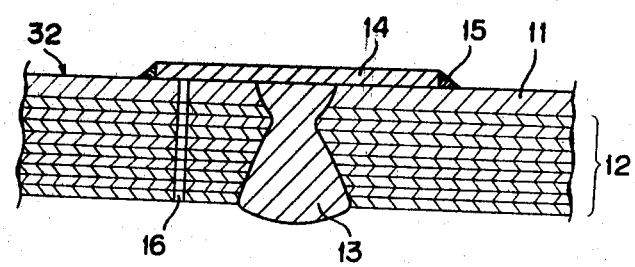
FIG. 3 is an enlarged sectional view similar to FIG. 2 of a container constructed in accordance with the invention.

In accordance with the present invention, a container or vessel generally designated 32 in FIG. 3 is provided which includes a laminate structure comprising an inner cylinder 11 and a plurality of tubes or cylinders of different dimensions which are arranged one within the other to form a laminate 12. The laminate 12 and the inner cylinder 11 are formed in unit lengths L and adjacent lengths are placed end to end and welded together by means of a weld 13 which forms an annular deposit of weld material. In accordance with the invention, a protection plate 14 of a hydrogen-resistant material is positioned over the weld material 13 after the surface thereof has been smoothed down on the side of the vessel which will be exposed to the hydrogen. The plate of hydrogen-resistant steel 14 is bounded to the inner cylinder 11 by deposit of weld metal 15 which comprises hydrogen-resistant steel. A gas hole 16 which is drilled through the complete laminate 12 including the inner cylinder 11 is covered at the inner side by the plate 14. If there is a high-pressure, high-temperature hydrogen gas in the container exposed to the inner wall 11, the hydrogen atoms will first be absorbed by the protection plate 14 made of hydrogen-resistant steel. The hydrogen which is diffused and led through the protection plate 14 is precipitated as hydrogen gas in the space between the plate 14 and the inner cylinder 11 and the deposited metal 13. Since the pressure in the space is kept at atmospheric pressure by means of the gas hole 16, the partial pressure of hydrogen in the space does not rise beyond the atmospheric pressure and the hydrogen does not penetrate to the cylinder 11 and the deposited metal 13 in the portion covered by the deposited metal 13 and the protection plate 14. In this manner the laminate 12 of carbon steel plates will be completely protected against hydrogen embrittlements. There is no limitation to the size of hydrogen-resistant steel plate 14, though it should be noted that a protection plate 14 proves effective only if it has a size larger than that which is enough to cover the deposited metal surface 13. The gas hole 16 may be located in any location if it is within the area covered by the hydrogen-resistant steel plate 14 and in some instances it may even be formed through the deposited metal.

Figure 4:
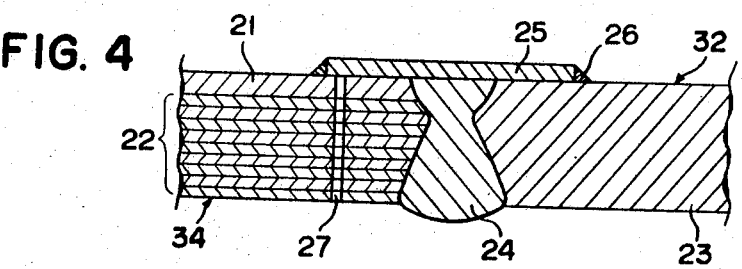
FIGS. 4 and 5 are views similar to FIG. 3 of other embodiments of the invention.

As indicated in FIG. 4, an end of the container 32 is formed by forged flange 23 which is bonded to an end block unit generally designated 34 by means of a circumferentially extending weld 24. The unit structure 34 comprises a laminate 22 and an inner cylinder 21 and a pressure equalizing hole 27 extends completely through the laminate structure including the inner cylinder 21 and the laminate 22. In this embodiment a protection plate 25 which is resistant to hydrogen attack is positioned over the weld 24 and secured around its periphery both to the inner cylinder 21 and to the forged plate 23.

Figure 5:
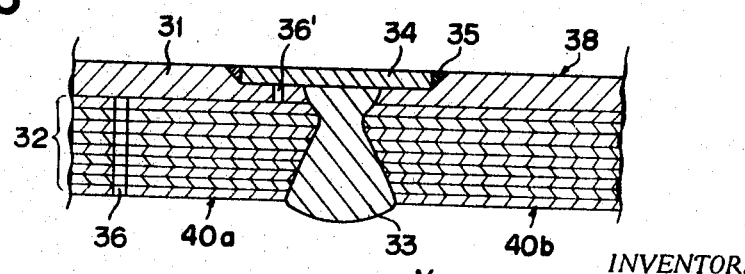

In the embodiment illustrated in FIG. 5, there is provided a container 38 which includes an inner cylinder 31 of a hydrogen-resistant steel and a laminate 32 formed of a plurality of carbon steel plates. The container portion which is shown includes two block sections or units 40a and 40b, each of which includes the laminate 32 and an interior cylinder 31 and are joined together by a weld 33. The pressure equalizing hole 36 is drilled through only the laminate structure 32 but a further equalizing hole 36' is arranged to extend from the surface of the first innermost plate of the laminate structure 32 through a portion of the plate 31 to a recess defined in the plate in the area around the weld material 33. A hydrogen-resistant steel plate 34 is positioned in the recess and is secured in position by a weld 35 of a hydrogen-resistant steel. The container 38 thus has no susceptability to hydrogen embrittlement, even though the laminated plates of the laminate structure 32 are made of a material which is not hydrogen-resistant.

The terms "carbon steel" and "ordinary steel" are used herein in connection with the invention, but it should be appreciated that carbon steel may be replaced by any steel having only limited hydrogen resistance or low alloy steel or high tension steel may be used as well as carbon steel. The term "steel resistant to hydrogen embrittlement" as used herein means steel manufactured by adding chromium or molybdenum to steel with the further addition, where necessary, of nickel, tungsten, titanium, vanadium, zirconium and niobium, or other alloy element so as to prevent or minimize the impairment of the steel in contact with the high-pressure, high-temperature hydrogen.

While specific embodiments of the invention have been shown and described in detail to illustrate the application of the inventive principles, it will be understood that the invention may be embodied otherwise without departing from such principles.

We claim:

1. A pressure vessel having an interior wall exposed to hydrogen comprising a plurality of units each including at least one tubular plate of predetermined length, said units being arranged end-to-end and joined together by an annular weld formed therebetween and extending as a continuous weld from the interior to the exterior of the vessel, at least one of said units comprising a laminate of a plurality of tubular vessel plates arranged one within the other, the vessel plate on the side which is to be exposed to hydrogen being of a hydrogen resistant material, a tubular protective plate covering the weld and a surrounding area of the vessel plate exposed to the hydrogen and projecting into the interior of said vessel from the interior surface of said units, a weld seam joining said protective plate to the interior vessel plate which is exposed to hydrogen and extending around each end of said protective plate, said protective plate and said weld seam being steel-resistant to hydrogen attack, and a pressure equalizing hole extending through all of said vessel plates the hole in the vessel plate on the interior of said vessel which is exposed to hydrogen being covered by said protective plate.